United States Patent
Fuechsel et al.

(10) Patent No.: US 10,315,687 B2
(45) Date of Patent: Jun. 11, 2019

(54) STEERING GEAR

(71) Applicant: Robert Bosch Automotive Steering GmbH, Schwäbisch Gmünd (DE)

(72) Inventors: Dennis Fuechsel, Schwäbisch Gmünd (DE); Ekkehard Kneer, Wendlingen (DE); Jens Hafermalz, Wäschenbeuren (DE); Marco Grau, Schwäbisch Gmünd (DE)

(73) Assignee: Robert Bosch Automotive Steering GmbH, Schwäbisch Gmünd (DE)

( * ) Notice: Subject to any disclaimer, the term of this patent is extended or adjusted under 35 U.S.C. 154(b) by 226 days.

(21) Appl. No.: 15/311,963

(22) PCT Filed: Apr. 7, 2015

(86) PCT No.: PCT/EP2015/057503
§ 371 (c)(1),
(2) Date: Nov. 17, 2016

(87) PCT Pub. No.: WO2015/176866
PCT Pub. Date: Nov. 26, 2015

(65) Prior Publication Data
US 2017/0096162 A1    Apr. 6, 2017

(30) Foreign Application Priority Data
May 20, 2014  (DE) .......... 10 2014 107 073

(51) Int. Cl.
*F16H 57/02* (2012.01)
*F16H 57/12* (2006.01)
(Continued)

(52) U.S. Cl.
CPC ......... *B62D 5/0409* (2013.01); *F16H 57/021* (2013.01); *F16H 57/039* (2013.01);
(Continued)

(58) Field of Classification Search
CPC .... F16H 55/18; F16H 55/24; F16H 2057/126; F16H 2057/127; F16H 1/16;
(Continued)

(56) References Cited

U.S. PATENT DOCUMENTS

| | | | | |
|---|---|---|---|---|
| 656,310 | A | * | 8/1900 | Warburton .............. F16C 27/04 384/101 |
| 829,658 | A | * | 8/1906 | Leavitt .................... F16C 23/06 384/519 |

(Continued)

FOREIGN PATENT DOCUMENTS

| | | |
|---|---|---|
| DE | 10123767 | 11/2001 |
| DE | 102007055814 | 6/2009 |

(Continued)

OTHER PUBLICATIONS

International Search Report for Application No. PCT/EP2015/057503 dated Jun. 18, 2015 (English Translation, 3 pages).

*Primary Examiner* — William Kelleher
*Assistant Examiner* — T. Scott Fix
(74) *Attorney, Agent, or Firm* — Michael Best & Friedrich LLP

(57) ABSTRACT

A steering gear having a gearwheel (2), a pinion shaft (3) which meshes with the former and is mounted such that it can be pivoted about a pivot axis which lies transversely with respect to the longitudinal axis (6) of the pinion shaft (3), wherein the pinion shaft (3) is loaded against the gearwheel (2) by means of a spring element which is integrated into a locating bearing (5) for the pinion shaft (3), which locating bearing (5) forms the pivot axis (7), and wherein the pinion shaft (3) is mounted in a floating bearing (8) such that is spaced apart axially from the pivot axis, which floating bearing (8) ensures mobility of the pinion shaft (3) which makes pivoting of the pinion shaft (3) about the pivot axis possible, wherein the floating bearing (8)

(Continued)

comprises an outer part and an inner part which is arranged movably in a radial direction with respect to the outer part, is characterized by a stop element (24) which limits the radial mobility of the inner part and can be positioned differently with regard to a stop surface which is provided for contact with the inner part.

7 Claims, 2 Drawing Sheets

(51) Int. Cl.
  *F16H 57/021* (2012.01)
  *F16H 57/039* (2012.01)
  *B62D 5/04* (2006.01)

(52) U.S. Cl.
  CPC ..... *F16H 57/12* (2013.01); *F16H 2057/0213* (2013.01); *F16H 2057/02082* (2013.01); *F16H 2057/127* (2013.01)

(58) Field of Classification Search
  CPC ............. F16H 2057/0213; F16H 57/12; F16H 2057/125; F16H 2057/213; F16H 2057/225; F16H 2057/0228; F16H 2057/0227; F16H 2057/02021; F16H 57/039; Y10T 74/19623; Y10T 74/19828; F16C 2326/24; F16C 2361/61; F16C 13/02; F16C 13/024; F16C 13/06; F16C 39/02; F16C 43/04; F16C 33/583; F16C 33/586; F16C 33/64; F16C 33/7833; F16C 23/06; F16C 25/083; H02K 7/081; H02K 7/1166; B62D 1/20; B62D 3/04; B62D 5/00; B62D 5/04; B62D 5/0403; B62D 5/0409; B62D 5/0421; B62D 5/0454
  USPC ................................... 74/425, 416
  See application file for complete search history.

(56) References Cited

U.S. PATENT DOCUMENTS

| | | | | |
|---|---|---|---|---|
| 1,165,432 A * | 12/1915 | Michaud | ............... | F16C 19/36 384/589 |
| 1,366,089 A * | 1/1921 | Leinert | ............... | F16C 27/04 384/535 |
| 1,758,479 A * | 5/1930 | Strempel | ............... | F16C 23/06 384/583 |
| 2,355,901 A * | 8/1944 | Beede | ............... | F16B 35/005 403/316 |
| 3,326,313 A * | 6/1967 | Martin | ............... | B60B 27/001 180/263 |
| 4,033,644 A * | 7/1977 | Reneerkens | ............. | B23Q 3/08 267/161 |
| 4,700,582 A * | 10/1987 | Bessette | ................. | F16H 55/14 74/409 |
| 4,790,202 A * | 12/1988 | Hayashi | ............... | B60N 2/0224 384/42 |
| 6,016,716 A * | 1/2000 | Mauro | ...................... | F16H 1/16 24/456 |
| 6,221,177 B1* | 4/2001 | Keener | .................... | B21K 1/58 148/275 |
| 6,527,642 B1* | 3/2003 | Arai | ..................... | B62D 5/0409 464/104 |
| 6,564,666 B1* | 5/2003 | Marcel | .................... | F16C 17/08 74/402 |
| 7,748,492 B2* | 7/2010 | Iwasa | .................. | B62D 5/0409 180/444 |
| 8,087,830 B2* | 1/2012 | Hafermalz | ............... | B62D 3/12 384/215 |
| 10,161,493 B2* | 12/2018 | Jonas | ...................... | F16H 48/40 |
| 2003/0127277 A1* | 7/2003 | Murakami | ........... | B62D 5/0409 180/443 |
| 2004/0029671 A1* | 2/2004 | Bock | .................... | B62D 5/0409 475/18 |
| 2005/0150372 A1* | 7/2005 | Nguyen | ................. | B62D 3/123 91/508 |
| 2005/0241164 A1* | 11/2005 | Glantz | .................. | F16C 35/067 33/290 |
| 2007/0205039 A1* | 9/2007 | Imagaki | ............... | B62D 5/0409 180/444 |
| 2007/0211976 A1* | 9/2007 | Fox | ........................ | F16C 19/497 384/494 |
| 2007/0221328 A1* | 9/2007 | DeMeter | ................ | B23Q 3/084 156/750 |
| 2009/0314114 A1* | 12/2009 | Grosberg | ................ | F16H 55/24 74/409 |
| 2011/0085752 A1* | 4/2011 | Tecza | ................... | F16C 32/0442 384/295 |
| 2012/0125132 A1* | 5/2012 | Bernhard | ............. | B62D 5/0409 74/89.14 |
| 2012/0272765 A1* | 11/2012 | Fuechsel | ............. | B62D 5/0409 74/416 |
| 2013/0075189 A1 | 3/2013 | Sekikawa et al. | | |
| 2014/0008142 A1* | 1/2014 | Yoshikawa | .......... | B62D 5/0409 180/444 |
| 2014/0083794 A1 | 3/2014 | Ishii | | |

FOREIGN PATENT DOCUMENTS

| | | |
|---|---|---|
| DE | 102008002769 | 8/2009 |
| DE | 102010002285 | 8/2011 |
| DE | 102012102665 | 10/2013 |
| DE | 102012103147 A1 | 10/2013 |
| EP | 2689987 | 1/2013 |
| EP | 2597014 | 5/2013 |
| WO | 2011073089 | 6/2011 |

* cited by examiner

STEERING GEAR

BACKGROUND OF THE INVENTION

The invention relates to a steering gear and particularly to a steering gear for a power steering system of a motor vehicle.

In the case of most of the motor vehicles, power steering systems are installed which generate a supporting torque while steering and therefore reduce the steering torque, which has to be applied by the driver to the steering column in order to cause the steering lock of the wheels.

The known power steering systems are based on a steering gear that translates the driving power of a hydraulic or electric drive and transfers the same to the steering column. Such steering gears are normally constructed in the form of a screw rolling gear and particularly as a helical drive gear or worm gear, i.e. these comprise a gearwheel that is directly or indirectly connected to the steering link as well as pinion shaft which meshes with the gearwheel and is driven by the auxiliary drive. The gearwheel as well as the pinion shaft is frequently made from plastic.

Gear backlash has been shown to be a problem in such steering gears, which occurs due to component tolerances, different heat expansion of the components and as a result of wear, respectively setting processes of the materials used for the gearwheel and the pinion shaft during the service life of the steering gear. In particular in the case of so-called change of steering i.e. the directly consecutive steering with variable steering lock, such a gear backlash generates undesirable noises, which result from the alternating abutment of opposing flanks of the teeth of the pinion shaft and gear wheel.

It is known that this gear backlash can be eliminated in that the pinion shaft can be mounted so as to pivot about an axis, which runs perpendicular to the longitudinal axis of the pinion shaft and spaced apart from the meshing engagement of pinion shaft and gearwheel and is pressed against the gearwheel by means of one or a plurality of spring elements. The pivotability of the pinion shaft is thereby integrated into one of the two bearings, via which the pinion shaft is mounted at the end. This bearing is referred to as a locating bearing. The bearing in the region of the other end is the designed with play (so-called "floating bearing") in order to facilitate the deflection caused by the pivoting movement. The locating bearing is generally provided on the drive side, while the floating bearing is provided at the free end of the pinion shaft.

A corresponding steering system is, for example, known from the WIPO patent application WO 2011/073089 A1. Provision is thereby made for the roller bearing, which accommodates the pinion shaft in the region of the locating bearing, to be mounted on the outside in a two-piece bearing bush. The bearing bush comprises an inner ring, which substantially accommodates the roller bearing free of play and an outer ring, which is substantially held free of play, wherein the outer and the inner ring are connected via narrow webs, which are elastically twisted when the outer ring is rotated towards the inner ring. The webs define not only the pivot axis, but these also act as spring elements, by means of which the pinion shaft is loaded against the gearwheel. To this end, a mounting of the pivot ring takes place with already twisted webs.

It is also known to integrate the one or plurality of spring elements for pressing the pinion shaft against the gearwheel into the floating bearing as this is, for example, disclosed in the German patent application DE 10 2007 055 814 A1.

In order to be able to compensate for the tolerances of the components of the steering gear due to manufacture as well as for the thermal expansions and for the effects of wear or respectively setting processes as a result of a use of the steering gear, it is necessary in the case of the known steering gears to provide a relatively large spring bias for the pinion shaft and thus prestressing of the spring elements. This has however the disadvantage that, when the steering gear is new if the spring bias has not yet been reduced as a result of a compensation of wear and setting effects, the strength with which the pinion shaft is pressed against the gearwheel is relatively large, which is connected with a correspondingly large gear friction and thus disadvantages in efficiency. This applies at least to those steering gears which do not fully utilize the admissible tolerances in total and thus for the spring bias provided to be oversized.

SUMMARY OF THE INVENTION

As a result of this prior art, it is the aim of the invention to specify an improved steering gear for a power steering system of a motor vehicle. A steering gear should particularly be specified, the friction losses of which are as small as possible when new.

The concept underlying the invention is to provide a relatively weak spring bias of the pinion shaft, said spring bias being dimensioned just sufficiently large to compensate the gear backlash that occurs by means of the operation of the steering gear as a result of thermal expansions and wear as well as setting processes; however, gear backlash could in principle still occur if the tolerances of the components are unfavorable. In order to prevent such a tolerance-based backlash, additional measures are therefore provided which act in a supporting manner to the compensation of the gear backlash by means of the spring bias.

To this end, in the case of a generic type steering gear comprising a gearwheel, a pinion shaft which meshes with the former and is pivotably mounted about a pivot axis which lies transversely and especially vertically with respect to the longitudinal axis of the pinion shaft, wherein the pinion shaft is loaded against the gearwheel by means of a spring element which is integrated into a locating bearing and wherein the pinion shaft is mounted in a floating bearing such that it is spaced apart axially from the pivot axis, which floating bearing ensures mobility of the pinion shaft which makes pivoting of the pinion shaft about the pivot axis possible, wherein the floating bearing comprises an outer part, in particular outer ring, which is preferably mounted in a housing of the steering gear, and an inner part, in particular inner ring, which is arranged movably in a radial direction with respect to the outer part. Provision is made according to the invention for a stop element to delimit the radial mobility of the inner part, which can be variously positioned with respect to a stop surface for contact with the inner part.

By means of the stop element, the radial mobility of the inner part with respect to the outer part can be individually delimited—independently of the respective tolerances of the components—in such a way that despite only weak spring bias by means of the spring element a gear backlash during the operation of the steering gear can be prevented by an abutment of the inner part of the floating bearing against the stop element. By means of the spring bias, a tolerance-conditioned gear backlash can thus be concretely compensated during the mounting of the steering gear. To this end, an only weak spring bias is sufficient because the steering gear is not yet situated in operation and moreover a gear backlash which tends towards increasing the signs of setting or wear has occurred. By means of the stop element, the zero backlash of the steering gear is then ensured during mounting (sealed) by said steering gear being positioned to rest against the inner ring and to be fastened to the same. As a result—independently of different dimensions lying within the scope of the tolerances—the comparatively weak spring bias is sufficient to also eliminate the backlash occurring during operation. The comparatively weak spring bias, which can be achieved in this way, leads to a comparatively small gear friction and consequently to correspondingly small frictional losses.

Because an elimination of gear backlash resulting from the spring bias is ensured by means of the stop element and this can consequently be used as a stop for a mobility in a radial direction (with respect to the longitudinal axis of the pinion shaft), which is opposed to that of the engagement of pinion shaft and gear wheel, provision can preferably be made for the stop element to be disposed on the side of the pinion shaft that is opposite the engagement of gear wheel and pinion shaft.

Because provision is preferably made when mounting the steering gear only to ensure the elimination of tolerance-conditioned gear backlash by means of the spring bias achieved and thus said steering gear no longer has to be changed with regard to the position thereof, it can be sufficient if the stop element is designed in such a way that the positioning thereof can take place only once and can subsequently no longer be changed. This allows for a comparatively cost effective design of the stop element that is easy to handle.

Provision can particularly be made for the stop element to comprise a contact member which is in contact with the inner part and which preferably cannot be substantially deformed with the provided forces and to comprise a holding member which fixes the holding element to the housing and/or to the outer part.

As a result, the different positioning of the stop element can preferably be achieved in that the holding member is configured from a curable material, in particular a corresponding plastic material. During the mounting of the steering gear, the stop element can thus be positioned such that said stop element rests without play against the inner part of the floating bearing and then ensures this position of the stop element by a curing of the material of the holding member, said positioning can lead to a materially bonded, frictional and/or positive-locking connection of the stop element to particularly the outer part of the floating bearing and/or the housing of the steering gear.

The curable material of the holding member can for example be designed in such a way that a curing is achieved by a change in temperature and consequently a heat input or a heat withdrawal. Provision can also be made for the material to be irradiated with light waves, for example UV or infrared radiation in order to obtain the desired curing. Provision can further be made for a curing agent to be supplied to the material prior to mounting the stop element and for the curing to be achieved within a time period allotted for the mounting of the stop element.

In order to permanently ensure the positioning of the stop element, provision can preferably be made for the connection between the stop element and the outer part of the floating bearing and/or the housing to also be configured in a positive-locking manner. Such a positive-locking connection can be implemented in a simple manner by configuring the holding member from a curable material if the housing and/or the outer part of the floating bearing forms a recess, in which the material of the holding member can ingress in a non-cured state and can cure there. Such a recess can, for example, be designed in the form of a circumferential groove.

A stop element, which can be connected in different positions to the outer part of the floating bearing and/or the housing, can, for example, also be configured in the form of a threaded bolt which can be screwed to different extents into an internal thread of the outer part and/or of the housing and is secured in the selected position by means of self-locking and/or by means of a separate holding element, such as, for example, a counter screw.

The use of a rivet-like stop element is also possible, which can be fixed in a force-fitting manner in the different positions by being pressed into an opening of the outer part and/or of the housing of the steering gear.

Provision can be made in a preferred embodiment of the steering gear according to the invention for the locating bearing for the integration of the spring element to comprise a bearing bush, which preferably has an annular outer part and a preferably annular inner part, which is disposed within the outer part, wherein the outer part and the inner part are connected to form the pivot axis via at least one web that allows a relative rotation of the outer part with respect to the inner part, wherein the web is designed in an elastically deformable manner; thus enabling the same to have the effect of a torsion bar.

The indefinite articles ("a", "of a") are as such not to be understood as a numeral in particular in the patent claims and in the description that explains the patent claims in general. Correspondingly components put in concrete terms are to be understood that said components are at least present once and can be present several times.

BRIEF DESCRIPTION OF THE DRAWINGS

The invention is subsequently explained in detail using one of the exemplary embodiments depicted in the drawings.

In the drawings.

DETAILED DESCRIPTION

Figure 1:
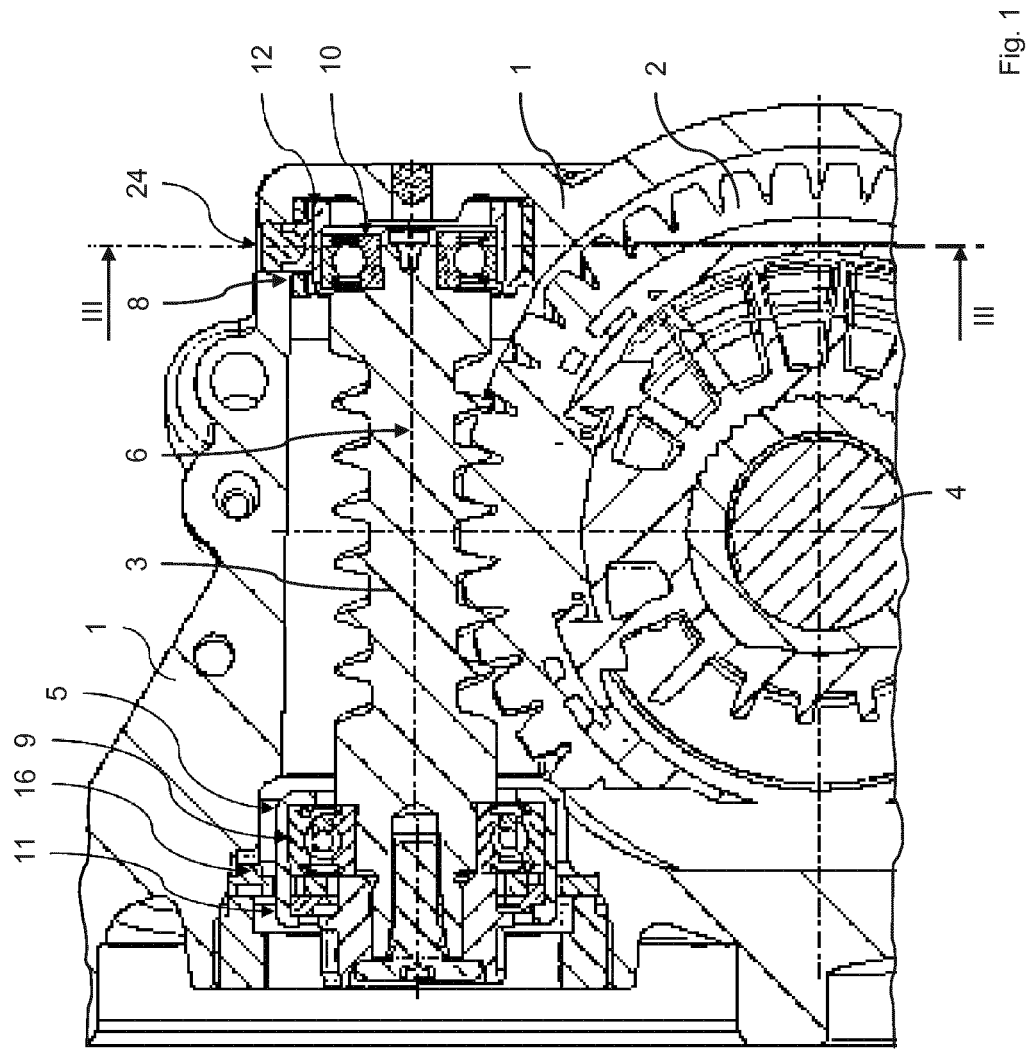
FIG. 1: shows a steering gear according to the invention in a longitudinal section.

FIG. 1 shows the substantial components of an embodiment of a steering gear according to the invention for a power steering system of a motor vehicle. Said steering gear comprises a multi-pieced housing 1, within which a gearwheel 2 as well as pinion shaft which meshes with the gearwheel 2 is rotatably disposed. The gearwheel 2 is fixedly connected to a steering column 4 of a motor vehicle.

The pinion shaft 3 has a drive-side end, via which said pinion shaft can be connected to the output shaft of a non-depicted drive (e.g. electric motor). In the region of this drive-side end, the pinion shaft is mounted by means of a locating bearing in the housing 1. The locating bearing 5 is designed in such a way that said bearing does not substantially allow any translation of the pinion shaft relative to the housing 1; however allows a pivoting about a pivot axis aligned perpendicularly to the longitudinal axis of the pinion shaft 3.

This pivoting causes a deflection of the free end of the pinion shaft 3 which is opposite to the drive-side end, said pinion shaft being mounted in a corresponding receptacle of the housing 1. This floating bearing 8 is designed in such a way that said bearing allows the deflection of the free end of pinion shaft 3 that ensues from the pivoting action.

The locating bearing 5 as well as the floating bearing 8 each comprise a roller bearing 9, 10 in which the corresponding section of the pinion shaft 3 is substantially mounted with zero backlash. The roller bearings 9, 10 themselves are mounted in respectively one bearing bush 11, 12, which in turn is disposed with zero backlash in a corresponding receptacle of the housing 1. The bearing bushes 11, 12 are constructively designed so that—in the case of the locating bearing 5—the pivoting of the pinion shaft 3 about the pivoting axis 7 is facilitated; and—in the case of the floating bearing 8—the deflection of the free end of the pinion shaft 3 is facilitated.

Figure 2:
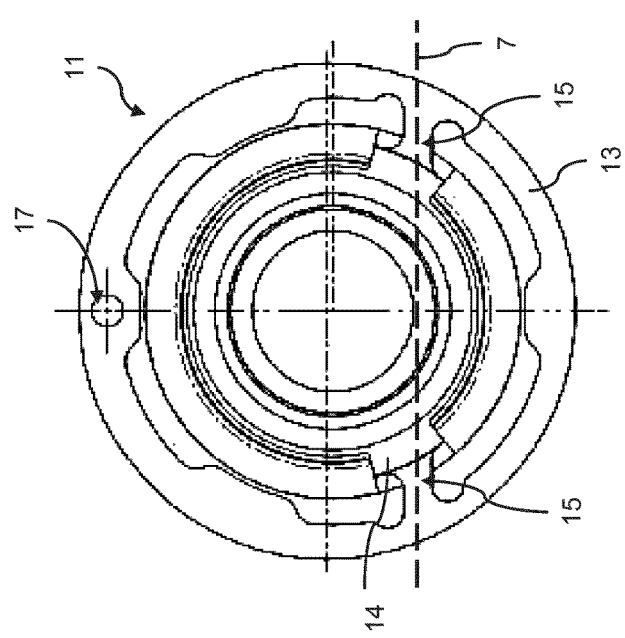
FIG. 2: shows the locating bearing in the steering gear of FIG. 1 in a top view.

To this end, the bearing bush 11 of the locating bearing 5 comprises an outer part in the form of an outer ring 13, for example made from spring steel, and an inner part in the form of an inner ring 14, for example likewise made from spring steel (cf. FIG. 2). The outer ring 13 is connected to the inner ring 14 via two webs 15 (e.g. made from spring steel), wherein the two webs 15 run substantially collinearly and thereby form the pivot axis 7, about which the inner ring 14 can pivot relative to the outer ring 13.

In addition, another projection 16 is formed on the outer ring 13 of the bearing bush 11 of the locating bearing 5 on one side and a recess is formed on the opposite side. These are used for the exact positioning of the bearing bush 11 and therefore the locating bearing 5 in the housing 1. To this end, the housing 1 has a corresponding mating contour.

Figure 3:
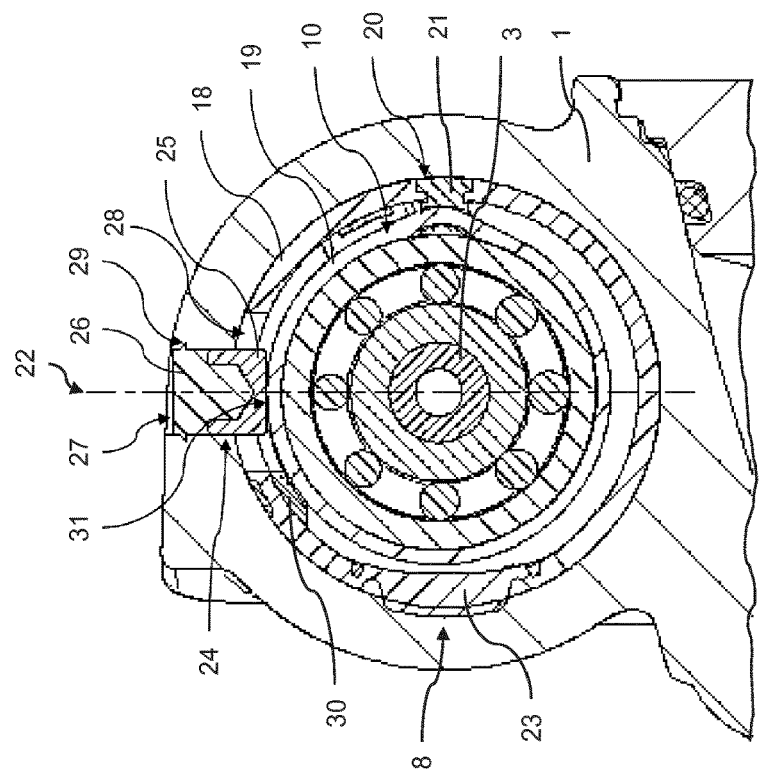
FIG. 3 shows a cross-section through the steering gear along the section plane III-III in FIG. 1.

FIG. 3 shows a cross-section through the steering gear in the region of the floating bearing 8. A substantial function of the bearing bush 12 of the floating bearing 8 is to permit the deflection of the free end of the pinion shaft 3 as a result of the pivoting thereof about the pivot axis 7 formed in the locating bearing 5. To this end, the bearing bush 12 likewise comprises an outer part in the form of an outer ring 18 and an inner part in the form of an inner ring 19. In one section, the inner ring 19 is connected via a joint 20 to the outer ring 18. In the region of the joint 20 sections of the outer ring 18 and the inner ring 19 come in contact with one another, wherein these sections are surrounded by an elastomer ring 21. A (pivot) joint 20 having a small pivoting torque is formed by this embodiment, said small pivoting torque facilitating a pivoting of the inner ring 19 relative to the outer ring 18 about a pivot axis lying in the region of the joint 20. During this pivoting movement, the outer ring 18 and the inner ring 19 slide or roll on each other in the sections that come into contact with one another, while the elastomer ring 21 allows this relative movement of outer ring 18 to inner ring and additionally ensures their cohesion.

Provision is made for the bearing bush 12 of the floating bearing 8 to be integrated into the housing 1 of the steering gear such that the pivoting of the pinion shaft 3 about the pivoting axis 7 formed in the locating bearing 5 leads to a displacement of the inner ring 19 relative to the outer ring 18 in the direction of that radial axis 22 of the bearing bush 12 which is aligned substantially perpendicular to the radial axis leading through the joint. In the direction of the radial axis of the bearing bush 12 leading through the joint, there ought preferably to be no axial displacement from the outer ring 18 to the inner ring 19 possible in order to if possible to prevent the pinion shaft 3 from interlocking on the gearwheel 2 during the operation of the steering gear. This is achieved in that the spacing between the inner ring 19 and the outer ring 18 in the section of the bearing bush 12 radially opposite the joint 20 is limited to a relatively small amount of, for example, 0.1 mm. This results from a limiting element 23 being mounted within the outer ring 18 so as to be displaceable in the radial direction. The limiting element 23 has a radial width that is larger than the radial width of the outer ring 18. As a result, the limiting element 23 of the bearing bush 12 that has yet to be mounted in the housing can be displaced outwardly to the extent that said limiting element protrudes beyond the outer surface of the outer ring 18 as this is depicted in FIG. 3; thus enabling a relative large spacing to occur between outside of the inner ring 19 and the limiting element 23.

This spacing is reduced to the desired amount when mounting the bearing bush 12 in the housing 1 because it is no longer possible for the limiting element 23 to tower above the outer surface of the outer ring 18 as a result of a collision with the housing 1, and the limiting element 23 has to be displaced radially inwards consequently for the mounting.

According to the invention, a stop element 24 is provided for the floating bearing 8, said stop element being disposed on the side of the pinion shaft opposite the engagement of pinion shaft 3 and gearwheel 2. The stop element 24 comprises a contact part 25 that makes contact with the inner ring 19 of the bearing bush 12 of the floating bearing 8 as well as a holding member 26 which can be fixed inside a receiving opening 27 of the housing 1. In order to facilitate a contact of the stop element 24 with the inner ring 19 of the bearing bush 12 of the floating bearing 8, the outer ring 18 thereof has a corresponding through opening 28. The stop element is provided for the purpose of eliminating a tolerance-conditioned gear backlash, respectively to ensure the elimination of such a gear backlash. To this end, the stop element 24 is positioned during the mounting of the (new) steering gear such that said stop element rests with zero backlash on the inner ring 19 by means of a stop surface 31 designed on the end face and if need be presses slightly against the inner ring 19. To this end, in the case of the plurality of like steering gears, different positions of the stop elements 24 in the associated receiving openings 27 of the housings 1 are necessary due to the manufacturing and mounting related tolerances of the components. The stop element 24 facilitates a fixing to the housing 1 in these different positions by said stop element being correspondingly positioned during the mounting of the steering gear in the receiving opening, wherein the material of the holding member 26 of the stop element 24 is not yet cured and can therefore be deformed. As a result, material of the holding member 26 can ingress into a recess 29 in the form of a circumferential groove that is formed in the wall of the receiving opening 27. By means of a subsequent curing of the material of the holding member 26, which, for example, can occur by introducing heat by means of irradiation with light or also by means of a previously added curing agent and waiting for a curing time to elapse, a materially bonded and positive-locking fixing of the stop element 24 in the receiving opening 27 of the housing is implemented, by means of which the stop element 24 can be permanently secured with respect to position. A spring bias is provided for the pinion shaft 3, which has the effect that the pinion shaft 3 is pivotably mounted and is pressed spring-loaded against the gearwheel 2, wherein the spring bias—just as the formation of the pivot axis—is implemented by the webs of the bearing bush 11 of the floating bearing, which are twisted as a result of the relative rotation of the outer ring 13 to the inner ring 14 and thus act functionally as a torsion bar. By the spring bias, it can on the one hand be ensured that that each inventive steering gear has substantially zero gear backlash despite tolerance-conditioned dimensional tolerances, form tolerances and position tolerances in the new state. This zero backlash is then ensured during mounting by means of the stop element 24, by said stop element being fixed so as to rest against the inner ring of the floating bearing 8 in the receiving opening 27.

In addition, the spring bias of the pinion shaft 3 causes a compensation of the backlash, which results in the short term during the operation of the steering gear as a consequence of different thermal expansions of the components and in the long term as a result of wear and setting processes of the materials of the pinion shaft 3 and the gearwheel 2. This operationally conditioned gear backlash which is to be maximally expected in the scope of the service life is however relatively small, in particular in comparison with a gear backlash that would occur for an unfavorable summation of the admissible tolerances for the components. The spring bias can therefore be relatively weakly designed as a result of ensuring the tolerance-conditioned steering gear backlash by means of the stop element. This has a particularly positive effect on the then correspondingly smaller gear friction, in particular when the steering gear is in a new state.

The outer ring 18 of the bearing bush 12 of the floating bearing 8 furthermore comprises an auxiliary stop element 30 that delimits a movement of the inner ring 19 when the pinion shaft 3 pivots upwards as in FIGS. 1 and 3. During normal operation of the steering gear, this auxiliary stop element 30 is not in contact with the inner ring 19. On the contrary, said auxiliary stop element should only support the meshing forces in misusage situations during the operation of the steering gear by means of a stoppage of the inner ring 19 and thereby prevent an overload on the stop element 24.

In an alternative embodiment of the steering gear according to the invention, which is not depicted in the drawings, provision can be made for the stop element 24 to contact the outer ring of the roller bearing 10 of the floating bearing 8. To this end, the inner ring 19 of the bearing bush 12 can be provided with a corresponding opening. In this case, the outer ring of the roller bearing 10, respectively the entire roller bearing 10 would represent the inner part of the inventive steering gear defined in the patent claims.

Further variations to that are likewise possible. Thus, there is the option to provide a section of the housing 1 as the outer part and a section of the pinion shaft 3 as the inner part of the inventive steering gear defined in the patent claims.

REFERENCE SIGN LIST 1 housing
2 gearwheel
3 pinion shaft
4 steering column
5 locating bearing
6 longitudinal axis of the pinion shaft
7 pivoting axis
8 floating bearing
9 roller bearing of the locating bearing
10 roller bearing of the floating bearing
11 bearing bush of the locating bearing
12 bearing bush of the floating bearing
13 outer ring of the bearing bush of the locating bearing
14 inner ring of the bearing bush of the locating bearing
15 web
16 projection
17 recess
18 outer ring of the bearing bush of the floating bearing
19 inner ring of the bearing bush of the floating bearing
20 joint
21 elastomer ring
22 radial axis
23 limiting element
24 stop element
25 contact member
26 holding member
27 receiving opening
28 through opening
29 recess
30 auxiliary stop element
31 stop surface

The invention claimed is:

1. A steering gear having
a gearwheel (2),
a pinion shaft (3) that meshes with the gearwheel (2) and is mounted such that the pinion shaft (3) can be pivoted about a pivot axis (7) that lies transversely with respect to a longitudinal axis (6),
wherein the pinion shaft (3) is loaded against the gearwheel (2) by means of a spring element that is integrated into a locating bearing (5) for the pinion shaft (3), the locating bearing (5) defining the pivot axis (7), and
wherein the pinion shaft (3) is mounted in a floating bearing (8) such that the floating bearing (8) is spaced apart axially from the pivot axis (7), the floating bearing (8) providing radial mobility of the pinion shaft (3) to make pivoting of the pinion shaft (3) about the pivot axis (7) possible, and
wherein the floating bearing (8) comprises
a bearing bush (12) having
an outer part, and
an inner part that is arranged movably in a radial direction with respect to the outer part,
a roller bearing positioned within the inner part of the bearing bush, and
a stop element (24) that limits the radial mobility of the inner part and that has a stop surface (31) configured for contact with the inner part, wherein the stop element (24) is positioned within a receiving opening (27) in a housing (1) of the steering gear and is initially configured to be adjustably positionable within the receiving opening (27) during assembly until located in a position to achieve a zero-backlash condition for the steering gear, and is then subsequently permanently and irreversibly fixed against further adjustable movement in the receiving opening (27).

2. The steering gear according to claim 1, characterized in that the stop element (24) is disposed on an opposite side of the pinion shaft (3) relative to engagement of the gearwheel (2) and the pinion shaft (3).

3. The steering gear according to claim 1, characterized in that the stop element (24) comprises a contact member (25) that makes contact with the inner part, and a holding member (26) that fixes the stop element (24) to a housing (1) of the steering gear and/or to the outer part.

4. The steering gear according to claim 3, characterized in that the holding member is formed from a curable material that is cured while in the receiving opening (27) to fix the stop element (24) against further movement in the receiving opening (27).

5. The steering gear according to claim 4, characterized in that the holding member engages, in a cured state, a recess (29) of the housing (1) and/or of the outer part.

6. The steering gear according to claim 1, characterized in that the stop element (24) has a threaded bolt, which is configured to be screwed to various extents into an internal thread of the outer part and/or of a housing (1) of the steering gear.

7. The steering gear according to claim 1, characterized in that the stop element (24) comprises a rivet that is pressed into an opening of the outer part and/or a housing (1) of the steering gear.

* * * * *